US010493524B2

(12) United States Patent
She et al.

(10) Patent No.: US 10,493,524 B2
(45) Date of Patent: Dec. 3, 2019

(54) POWDER METAL WITH ATTACHED CERAMIC NANOPARTICLES

(71) Applicant: United Technologies Corporation, Farmington, CT (US)

(72) Inventors: Ying She, East Hartford, CT (US); John A. Sharon, Manchester, CT (US); James T. Beals, West Harford, CT (US); Aaron T. Nardi, East Granby, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 225 days.

(21) Appl. No.: 15/678,260

(22) Filed: Aug. 16, 2017

(65) Prior Publication Data

US 2017/0368602 A1 Dec. 28, 2017

Related U.S. Application Data

(63) Continuation of application No. 14/670,623, filed on Mar. 27, 2015, now Pat. No. 9,796,019.

(51) Int. Cl.
  *B29C 64/153* (2017.01)
  *B22F 1/02* (2006.01)
  (Continued)

(52) U.S. Cl.
  CPC .............. *B22F 1/02* (2013.01); *B22F 1/0085* (2013.01); *B22F 3/1055* (2013.01);
  (Continued)

(58) Field of Classification Search
  CPC ........ B22F 1/0085; B22F 1/0088; B22F 1/02; B22F 1/0062; B22F 2998/10;
  (Continued)

(56) References Cited

U.S. PATENT DOCUMENTS 6,680,279 B2   1/2004   Cai et al.
6,855,426 B2   2/2005   Yadav
(Continued)

FOREIGN PATENT DOCUMENTS

CN     1333099       1/2002
WO     2013159558    10/2013
(Continued)

OTHER PUBLICATIONS

European Search Report for European Patent Application No. 16160861 completed Sep. 23, 2016.

*Primary Examiner* — Alexander M Weddle
(74) *Attorney, Agent, or Firm* — Carlson, Gaskey & Olds, P.C.

(57) ABSTRACT

A method for processing a powder material includes feeding a powder material through an additive processing machine to deposit multiple layers of the powder material onto one another and using an energy beam to thermally fuse selected portions of the layers to one another with reference to data relating to a particular cross-section of an article being formed. The powder material has spherical metal particles and a spaced-apart distribution of ceramic nanoparticles attached to the surfaces of the particles. The ceramic nanoparticles form a dispersion of reinforcement through the formed article.

10 Claims, 2 Drawing Sheets

(51) Int. Cl.
*B22F 1/00* (2006.01)
*B23K 26/342* (2014.01)
*B23K 26/00* (2014.01)
*B23K 15/00* (2006.01)
*B22F 3/105* (2006.01)
B23K 103/02 (2006.01)
B23K 103/08 (2006.01)
B23K 103/10 (2006.01)
B23K 103/14 (2006.01)
B23K 103/00 (2006.01)
C22C 32/00 (2006.01)

(52) U.S. Cl.
CPC ...... *B23K 15/0086* (2013.01); *B23K 15/0093* (2013.01); *B23K 26/0006* (2013.01); *B23K 26/342* (2015.10); *B29C 64/153* (2017.08); *B22F 2998/10* (2013.01); *B23K 2103/02* (2018.08); *B23K 2103/08* (2018.08); *B23K 2103/10* (2018.08); *B23K 2103/14* (2018.08); *B23K 2103/52* (2018.08); *C22C 32/0015* (2013.01); *Y02P 10/295* (2015.11)

(58) Field of Classification Search
CPC .............. B23F 3/1055; B23K 15/0086; B23K 15/0093; B23K 2103/02; B23K 2103/08; B23K 2103/10; B23K 2103/14; B23K 2103/52; B23K 26/0006; B23K 26/342; B29C 64/153
USPC ........................................................ 427/212
See application file for complete search history.

(56) References Cited

U.S. PATENT DOCUMENTS

| | | |
|---|---|---|
| 2011/0183833 A1 | 7/2011 | Da Silva et al. |
| 2012/0012777 A1 | 1/2012 | Sugiyama et al. |
| 2016/0175929 A1* | 6/2016 | Colin ............... C04B 35/62839 419/23 |

FOREIGN PATENT DOCUMENTS

| | | | |
|---|---|---|---|
| WO | WO-2015001241 A2 * | 1/2015 | ....... C04B 35/62839 |
| WO | 2015036802 | 3/2015 | |

* cited by examiner

POWDER METAL WITH ATTACHED CERAMIC NANOPARTICLES

CROSS-REFERENCE TO RELATED APPLICATION

The application is a continuation of U.S. patent application Ser. No. 14/670,623 filed Mar. 27, 2015.

STATEMENT REGARDING FEDERALLY SPONSORED RESEARCH OR DEVELOPMENT

This invention was made with government support under contract number W911NF-14-2-0011 awarded by the United States Army. The government has certain rights in the invention.

BACKGROUND

High performance alloys can be used in relatively severe environments to provide enhanced mechanical properties, such as high strength, creep resistance, and oxidation resistance. For example, such alloys are dispersion-strengthened and include a metallic matrix with a second phase of oxide, nitride, or carbide dispersed uniformly throughout the matrix.

One technique for fabricating dispersion-strengthened alloys is milling. Milling involves ball milling a metal feedstock powder and reinforcement phase particles to incorporate the reinforcement phase particles into the metal powder. The reinforcement phase particles are generally not soluble in the base metal. Long times are needed to achieve an appropriate dispersion and process control agents are often needed to limit agglomeration. The agents must later be removed, the resulting particles are irregularly-shaped, and there is also difficulty in achieving consistency from batch-to-batch.

SUMMARY

A method for processing a powder material according to an example of the present disclosure includes feeding a powder material through an additive processing machine to deposit multiple layers of the powder material onto one another. The powder material has spherical metal particles and a spaced-apart distribution of ceramic nanoparticles attached to the surfaces of the particles. An energy beam is used to thermally fuse selected portions of the layers to one another with reference to data relating to a particular cross-section of an article being formed. The ceramic nanoparticles form a dispersion of reinforcement through the formed article.

In a further embodiment of any of the foregoing embodiments, the ceramic nanoparticles are selected from the group consisting of oxides, nitrides, carbides, and combinations thereof.

In a further embodiment of any of the foregoing embodiments, the ceramic nanoparticles are oxide nanoparticles.

In a further embodiment of any of the foregoing embodiments, the ceramic nanoparticles are zirconium oxide nanoparticles.

In a further embodiment of any of the foregoing embodiments, the powder material has a composition, by weight, of 0.1-5% of the ceramic nanoparticles.

In a further embodiment of any of the foregoing embodiments, the spherical metal particles are selected from the group consisting of nickel, chromium, aluminum, titanium, iron, and combinations thereof.

In a further embodiment of any of the foregoing embodiments, the spherical metal particles are nickel-based particles and include chromium.

In a further embodiment of any of the foregoing embodiments, the ceramic nanoparticles are zirconium oxide nanoparticles and the powder material has a composition, by weight, of 0.1-5% of the ceramic nanoparticles.

In a further embodiment of any of the foregoing embodiments, the spherical metal particles are selected from the group consisting of nickel, chromium, aluminum, titanium, iron, and combinations thereof.

In a further embodiment of any of the foregoing embodiments, the spherical metal particles are nickel-based particles and include chromium.

A powder material according to an example of the present disclosure includes spherical metal particles, and a spaced-apart distribution of ceramic nanoparticles attached to the surfaces of the particles.

In a further embodiment of any of the foregoing embodiments, the spherical metal particles are selected from the group consisting of nickel, chromium, and combinations thereof.

In a further embodiment of any of the foregoing embodiments, the ceramic nanoparticles are selected from the group consisting of oxides, nitrides, carbides, and combinations thereof, and the powder material has a composition, by weight, of 0.1-5% of the ceramic nanoparticles.

In a further embodiment of any of the foregoing embodiments, the ceramic nanoparticles are oxide nanoparticles.

In a further embodiment of any of the foregoing embodiments, the ceramic nanoparticles are zirconium oxide nanoparticles.

In a further embodiment of any of the foregoing embodiments, the spherical metal particles are nickel-based particles and include chromium.

In a further embodiment of any of the foregoing embodiments, the ceramic nanoparticles are zirconium oxide nanoparticles.

In a further embodiment of any of the foregoing embodiments, the powder material has a composition, by weight, of 0.1-5% of the ceramic nanoparticles.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
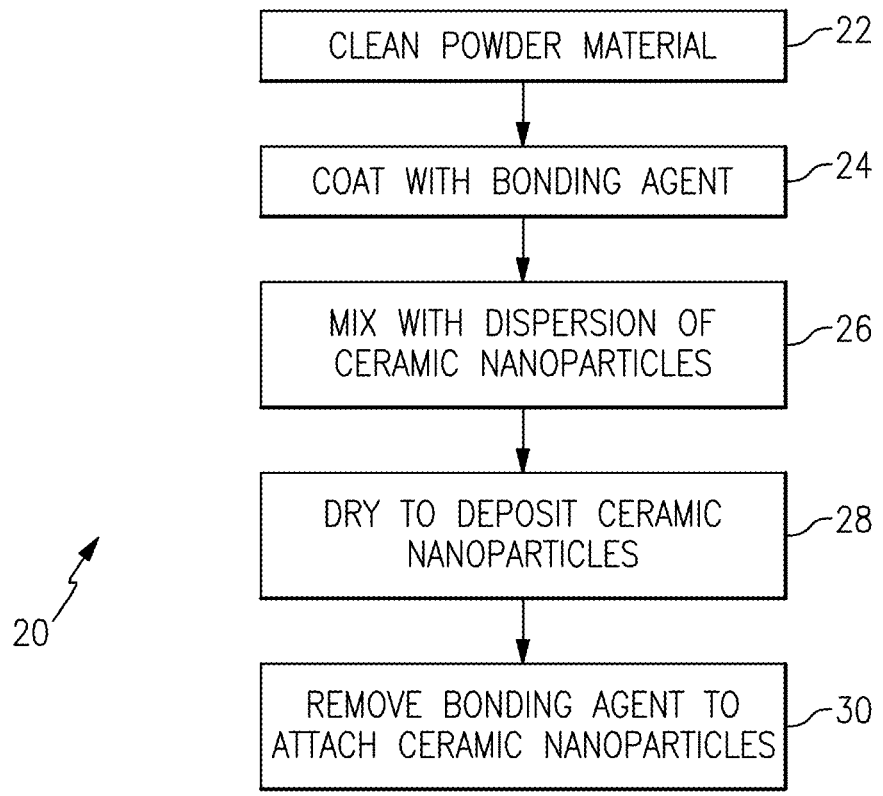
FIG. 1 illustrates an example method for processing a powder material.

FIG. 1 illustrates an example method 20 for processing a powder material. As will be described, the resulting powder material produced using the method 20 has spherical metal particles with a spaced-apart distribution of ceramic nanoparticles attached on the surfaces of the spherical metal particles. The powder material can readily be used in an additive fabrication process to form an end-use article with dispersion-strengthening from the ceramic nanoparticles.

Alloys with dispersed secondary reinforcement phases can be fabricated by milling; however, this processing technique cannot produce powder that can be used in additive fabrication processing. Powders in additive fabrication processes are fed through an additive manufacturing machine and deposited layer-by-layer in a workspace where an energy beam can be used to selectively fuse portions of the layers to form the end-use article. For proper feeding and deposition of the layers, the powder typically has a controlled particle size and a spherical powder particle shape that permits easy flow through the equipment and uniform deposition of the layers. Thus, although dispersion-strengthened alloys can be fabricated by milling, the resulting particles are irregularly-shaped and are thus not suited for reliable flow through additive fabrication equipment. The example method 20 provides a spherical metal powder that has ceramic nanoparticles attached to the surfaces thereof and which can be readily used in additive fabrication processing.

As will be appreciated, the steps of the method 20 can be used in combination with other processing steps. The example method 20 includes a cleaning step 22. In the cleaning step 22, the surfaces of an initial powder material are prepared for attachment of the ceramic nanoparticles. The initial powder material includes spherical metal particles. For example, the spherical metal particles have an average particle size of approximately 10-50 micrometers, which will typically be suitable for many additive fabrication techniques. Of course, the powder may have a different average size if needed by a particular additive fabrication process.

The metal can be a pure metal or an alloy of several metals. Although not limited, the metal can include nickel, chromium, aluminum, titanium, iron, or combinations thereof, which may be useful in aerospace articles.

The surfaces of the initial powder material may contain oxides and/or foreign substances that can otherwise inhibit attachment of the ceramic nanoparticles. For example, the initial powder material can be cleaned using an acid, to etch away surface oxides and foreign substances to provide a "fresh" metal surface for attachment. The type and concentration of the acid can be selected in accordance with the metal or metals to effectively etch the surfaces without damaging the bulk particles.

The cleaned spherical metal particles are then subjected to a coating step 24. In the coating step 24, the cleaned spherical metal particles are coated with an organic bonding agent. The organic bonding agent will later facilitate attachment of the ceramic nanoparticles in the method 20.

As an example, the organic bonding agent includes a surfactant that has polar end groups. The polar end groups facilitate polar bonding with the surfaces of the spherical metal particles and, later in the method 20, also polar bonding with the ceramic nanoparticles. In this regard, the surfactant can be selected in correspondence with the metal of the spherical metal particles and the composition of the ceramic nanoparticles such that polar end groups are selected for polar bonding with the metal particles and also with the ceramic nanoparticles. For example, the metal and the ceramic nanoparticles may have either a positive polarity or a negative polarity, and the end groups are selected to have a negative or positive polarity to form polar bonds with the metal and with the ceramic nanoparticles.

In a further example, the surfactant includes dodecyl sulfate, such as sodium dodecyl sulfate. For instance, the dodecyl sulfate can be used with metal particles that include nickel, chromium, or combinations thereof and with oxide ceramic nanoparticles.

After the coating step 24, the coated spherical metal particles are subjected to a mixing step 26. In the mixing step 26, the coated spherical metal particles are mixed with a dispersion that contains a carrier substance, such as a liquid-based medium, and the ceramic nanoparticles. The ceramic nanoparticles can include oxide particles, nitride particles, carbide particles, or mixtures thereof. Zirconium oxide is one example of oxide particles. Silicon carbide is one example of carbide particles. Silicon nitride is one example of nitride particles.

The dispersion can include, but is not limited to, a colloid that has a suspension of the ceramic nanoparticles in the carrier substance. The mixture can be agitated or stirred for a period of time to disperse the ceramic nanoparticles uniformly over the surfaces having the organic bonding agent. The ceramic nanoparticles attach by polar bonding to the polar end groups of the organic bonding agent.

The spherical metal particles can then be rinsed in water. The rinsing removes much of the excess dispersion and carrier substance. Since the ceramic nanoparticles are relatively weakly bonded by polar bonding (e.g., by van der Waals forces) to the organic bonding agent, severe rinsing with large amounts of water and agitation may undesirably wash away some of the bonded ceramic nanoparticles. Thus, in one example, a controlled amount of deionized water and, optionally, gentle stirring, can be used for the rinse to limit wash-away loss of the bonded ceramic nanoparticles.

For example, the controlled amount of water can be a function of the concentration of the ceramic nanoparticles in the dispersion, the concentration of the ceramic nanoparticles bonded on the spherical metal particles, or both. Thus, only a limited amount of water may be used to avoid washing away a substantial amount of the bonded ceramic nanoparticles and to produce a desired spaced-apart distribution of the ceramic nanoparticles. Given this disclosure, those skilled in the art will be able to readily determine appropriate rinsing through experimentation using different amounts of water and observation of how much of the ceramic nanoparticles are washed away.

Residual amounts of the carrier substance may be present on the spherical metal particles, even after washing. At step 28, the spherical metal particles are dried to remove any residual carrier and to deposit the ceramic nanoparticles with the spaced-apart distribution onto the organic bonding agent on the surfaces of the spherical metal particles. For example, the spaced-apart distribution of the ceramic nanoparticles is provided by the selected concentration of the ceramic nanoparticles in the dispersion that is used in the mixing step 26. If this concentration is relatively high, the ceramic nanoparticles will be deposited in a continuous coating rather than in the spaced-apart distribution. The spaced-apart distribution is desired for providing a dispersion of the ceramic nanoparticles in the end article after additive fabrication, whereas a continuous coating may result in agglomeration of the ceramic nanoparticles.

At step 30, the organic bonding agent is thermally removed from the spherical metal particles to thereby attach the ceramic nanoparticles to the surfaces of the spherical metal particles. For example, the spherical metal particles are thermally treated in a heating chamber at an elevated temperature for a determined period of time to thermally remove the organic bonding agent. As can be appreciated, the specific treatment temperature may be dependent upon the selected organic bonding agent. However, in most instances, organic materials will decompose and volatilize from the powder at temperatures above approximately 550° C. in an air or an inert environment.

The resulting powder material includes the spherical metal particles with the ceramic nanoparticles attached, by polar bonding, to the surfaces thereof. In further examples, the resulting powder material has a composition, by weight, of 0.1-5% of the ceramic nanoparticles and a remainder of the metal. In a further example, the spherical metal particles include nickel and chromium, the ceramic nanoparticles are zirconium oxide, and the resulting powder material has a composition, by weight, of 0.1-5% of the zirconium oxide. The amount of ceramic nanoparticles on the resulting powder material can be controlled by controlling the concentration of the ceramic nanoparticles in step 26 and the optional controlled rinsing. When the content of ceramic coating is below a desirable amount in one single coating process described above, the coating process can be repeated from the step of adding the organic bonding to the step of thermal treatment until the desirable content is achieved.

Figure 2:
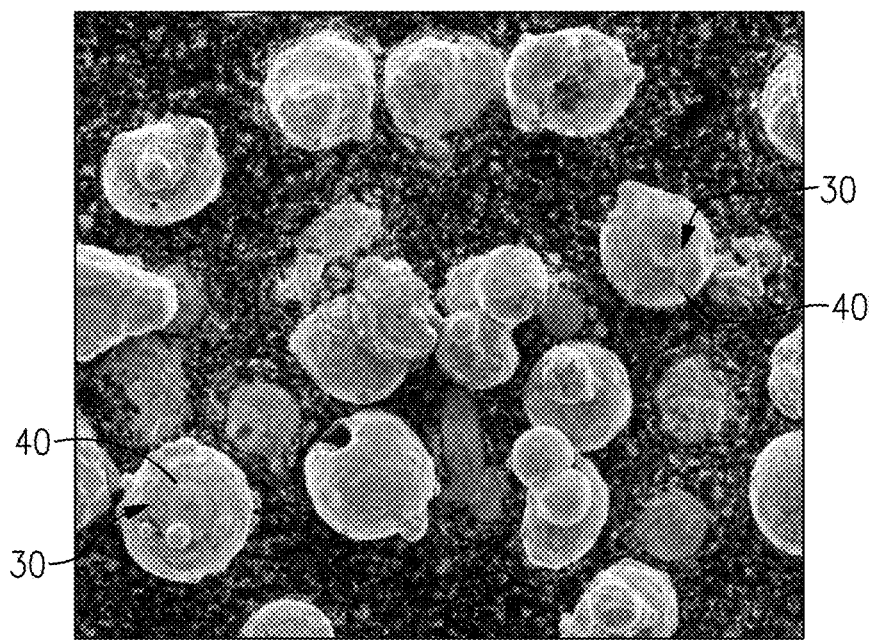
FIG. 2 illustrates a low magnification micrograph of metal particles that have ceramic nanoparticles attached on the surfaces.
Figure 3:
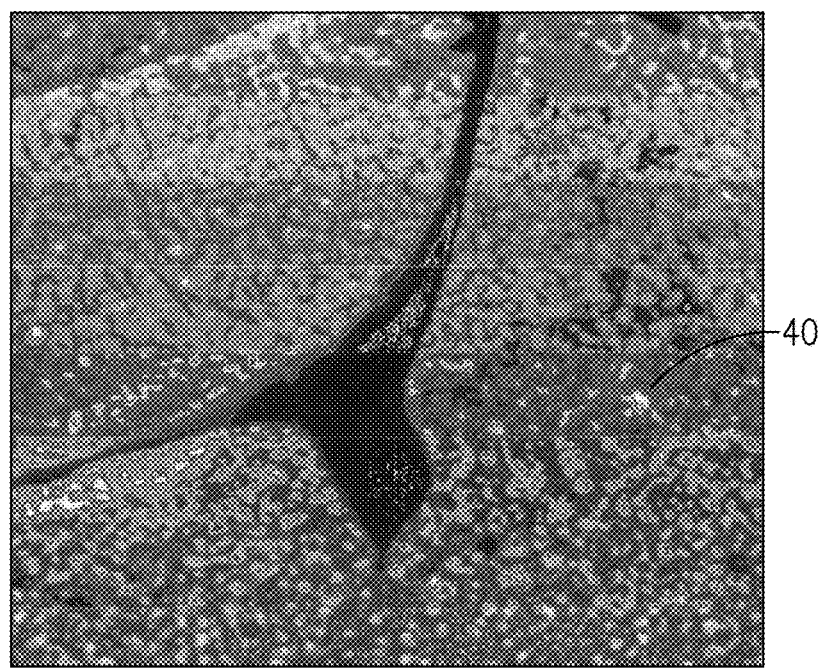
FIG. 3 illustrates a high magnification micrograph of the surface of a metal particle with a spaced-apart distribution of ceramic nanoparticles attached on the surface.

FIG. 2 shows a micrograph at low magnification of several spherical metal particles 30 that have the ceramic nanoparticles 40 attached on the surfaces thereof. FIG. 3 shows a representative surface of one of the spherical metal particles with the spaced-apart distribution of the ceramic nanoparticles 40 (whitish in color) attached on the surface thereof (dark color). As shown, the ceramic nanoparticles 40 are discrete particles on the surface, with a relatively uniform, spaced-apart distribution.

The following is a further, non-limiting example of the method 20. Nanoparticles of zirconium oxide ($ZrO_2$) were attached onto surfaces of a spherical metal powder of composition nickel-20 wt % chromium using sodium dodecyl sulfate as the surfactant organic bonding agent. The zirconium oxide was provided in a colloidal solution with nanoparticle sizes of approximately five to ten nanometers. Approximately 30 grams of the Ni-20 wt. % Cr powder with a mean particle size of approximately 40 micrometers was etched in a beaker using approximately 14 ml of 18.5 wt % hydrochloric acid for several minutes to create a fresh surface on the powder. The etched powder was rinsed with deionized water several times. Approximately 75 ml of 1 wt % sodium dodecyl sulfate was added into the beaker with the etched powder and was stirred at room temperature for several hours. The powder was then rinsed with deionized water several times and dried in an oven at 120° C. for several hours. Approximately 21 grams of 20 wt % zirconium oxide colloid solution was added into the beaker and the powder was stirred at approximately 40° C. for several hours, followed by an aging process at room temperature for approximately one day. The powder was then rinsed with a controlled amount of deionized water, to avoid wash-away of the attached zirconium oxide nanoparticles. The powder was then dried in an oven at approximately 120° C. for several hours with a ramp rate of approximately 2° C./min. The dried powder was then calcined in a furnace at 550° C. with a ramp rate of 2° C./min for several hours under ambient atmosphere. The zirconium oxide nanoparticles were observed in a spaced-apart distribution on the surface of the powder.

The powder material produced from the method 20 may be further processed in another method that includes feeding the powder through an additive processing machine to deposit multiple layers of the powder material onto one another, and then using an energy beam to thermally fuse selected portions of the layers to one another with reference to data, such as computer-aided drawing data, relating to a particular cross-section of an article being formed. The energy beam melts or partially melts the metal such that the selected portions of the layers of powder fuse together. The ceramic nanoparticles may not melt, but disperse into the melted or softened portions of the metal to thus provide a relatively uniform dispersion of reinforcement through the formed article.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method for processing a powder material, the method comprising:
    feeding a powder material through an additive processing machine to deposit multiple layers of the powder material onto one another, the powder material having spherical metal particles and a spaced-apart distribution of ceramic nanoparticles attached to the surfaces of the particles; and
    using an energy beam to thermally fuse selected portions of the layers to one another with reference to data relating to a particular cross-section of an article being formed, the ceramic nanoparticles forming a dispersion of reinforcement through the formed article.

2. The method as recited in claim 1, wherein the ceramic nanoparticles are selected from the group consisting of oxides, nitrides, carbides, and combinations thereof.

3. The method as recited in claim 1, wherein the ceramic nanoparticles are oxide nanoparticles.

4. The method as recited in claim 1, wherein the ceramic nanoparticles are zirconium oxide nanoparticles.

5. The method as recited in claim 1, wherein the powder material has a composition, by weight, of 0.1-5% of the ceramic nanoparticles.

6. The method as recited in claim 1, wherein the spherical metal particles are selected from the group consisting of nickel, chromium, aluminum, titanium, iron, and combinations thereof.

7. The method as recited in claim 1, wherein the spherical metal particles are nickel-based particles and include chromium.

8. The method as recited in claim 1, wherein the ceramic nanoparticles are zirconium oxide nanoparticles and the powder material has a composition, by weight, of 0.1-5% of the ceramic nanoparticles.

9. The method as recited in claim 8, wherein the spherical metal particles are selected from the group consisting of nickel, chromium, aluminum, titanium, iron, and combinations thereof.

10. The method as recited in claim 8, wherein the spherical metal particles are nickel-based particles and include chromium.

\* \* \* \* \*